(12) United States Patent
Yokoyama et al.

(10) Patent No.: US 7,106,346 B2
(45) Date of Patent: Sep. 12, 2006

(54) SIGNAL PROCESSING APPARATUS AND METHOD, RECORDING MEDIUM, AND PROGRAM

(75) Inventors: Kazuki Yokoyama, Kanagawa (JP); Kazuhiko Ueda, Kanagawa (JP); Mitsuyasu Asano, Tokyo (JP); Takeshi Kubozono, Kanagawa (JP); Tetsuji Inada, Tokyo (JP)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 10/887,436

(22) Filed: Jul. 8, 2004

(65) Prior Publication Data

US 2005/0035977 A1 Feb. 17, 2005

(30) Foreign Application Priority Data

Jul. 11, 2003 (JP) ............................. 2003-273155

(51) Int. Cl.
*G09G 5/00* (2006.01)
(52) U.S. Cl. ...................... 345/611; 345/612; 345/615; 345/639; 345/643
(58) Field of Classification Search ................ 345/611, 345/612, 615, 639, 643
See application file for complete search history.

(56) References Cited

U.S. PATENT DOCUMENTS

| 6,091,388 | A  | * | 7/2000  | Kanbe et al. ................. 345/97 |
| 6,475,516 | B1 | * | 11/2002 | DiCosmo et al. ........... 424/450 |
| 6,684,000 | B1 | * | 1/2004  | Sakurai et al. .............. 382/324 |
| 2003/0112796 | A1 | * | 6/2003 | Kwan ......................... 370/352 |
| 2004/0017224 | A1 | * | 1/2004 | Turner et al. ................. 327/51 |

FOREIGN PATENT DOCUMENTS

JP 2001-298621 10/2001

\* cited by examiner

*Primary Examiner*—Kee M. Tung
*Assistant Examiner*—Mike Rahmjoo
(74) *Attorney, Agent, or Firm*—Finnegan, Henderson, Farabow, Garrett & Dunner, L.L.P.

(57) ABSTRACT

An n-filter according to the present invention includes a nonlinear filter, a pattern detector, and a switch. The nonlinear filter maintains a steep edge whose size is larger than a predetermined threshold in fluctuations of pixels constituting an input image signal and, at the same time, smoothes a non-edge portion that does not include the edge. The pattern detector detects a fine edge in the fluctuations of the pixels constituting the input image signal and notifies the switch that the fine edge exists. The switch outputs the input image signal or an image signal output from the nonlinear filter to the subsequent stage in accordance with the notification from the pattern detector.

5 Claims, 11 Drawing Sheets

SIGNAL PROCESSING APPARATUS AND METHOD, RECORDING MEDIUM, AND PROGRAM

BACKGROUND OF THE INVENTION

1. Field of the Invention

The present invention relates to signal processing apparatuses and methods, recording media, and programs, and more particularly, to a signal processing apparatus and method, a recording medium, and a program, for example, suitable for maintaining a steep edge of pixels constituting an image and, at the same time, smoothing a non-edge portion that does not include the edge.

2. Description of the Related Art

In order to increase the contrast, that is, the brightness contrast, and the definition, that is, the clarity of outline, of images captured by image capturing devices, such as charge-coupled devices (CCDs) or complementary metal-oxide semiconductors (CMOSs), in video cameras, contrast enhancement methods by gray scale conversion and high-frequency component enhancement methods for enhancing the contrast of high-frequency components in images have been available.

Contrast enhancement methods called tone curve adjustment for converting the levels of pixels of an image using functions having predetermined input-output relationships (hereinafter, referred to as level conversion functions) and histogram equalization for accommodatively converting the level conversion functions in accordance with frequency distribution of the pixel levels have been suggested.

A high-frequency component enhancement method called unsharp masking for extracting an edge in an image and enhancing the extracted edge, that is, so-called outline enhancement, has been suggested.

In contrast enhancement methods, however, the contrast of only a part of a brightness area of the whole dynamic range (a difference between the maximum level and the minimum level) of an image can be increased. Moreover, in the tone curve adjustment, the contrast is reduced in the brightest part and the darkest part of an image and, in the histogram equalization, the contrast is reduced in a brightness area with less frequency distribution. Furthermore, in the high-frequency component enhancement method, since only the contrast of high-frequency components of an image is enhanced and an area near an edge in the image is thus unnaturally enhanced, the quality of the image is inevitably reduced.

Figure 1:
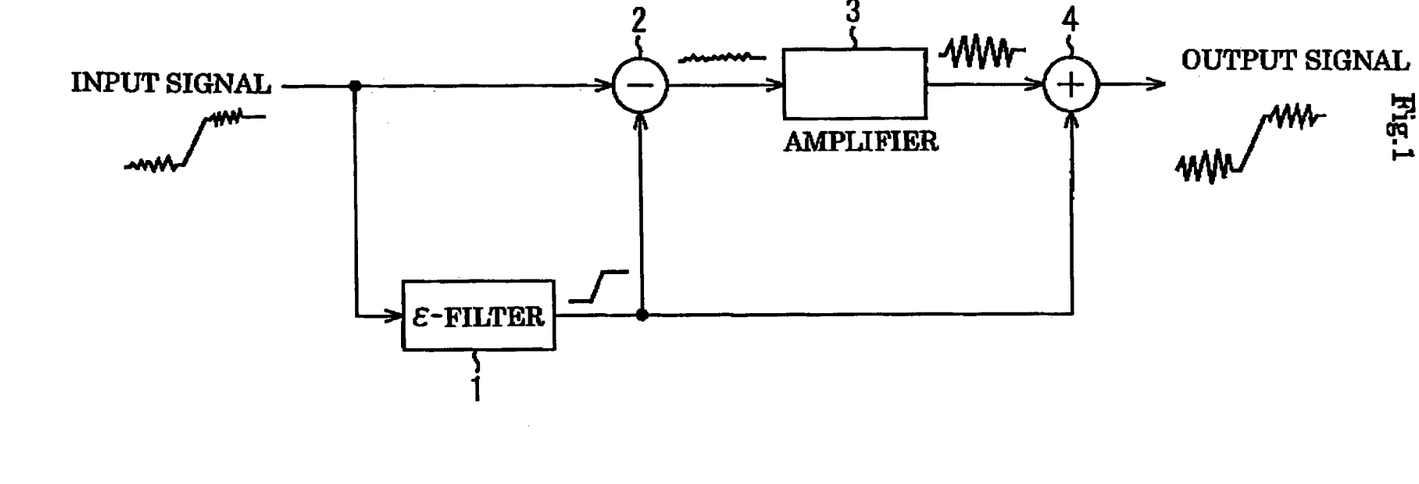
FIG. 1 is a block diagram showing an example of the structure of an image signal processing apparatus for maintaining a steep edge in an image and, at the same time, for enhancing a non-edge portion that does not include the edge.

A method for maintaining a steep edge in which a pixel value changes steeply and, at the same time, for amplifying a non-edge portion that does not include the edge in input image data so as to enhance the non-edge portion by an image signal processing apparatus arranged, as shown in FIG. 1, is disclosed, for example, in Japanese Unexamined Patent Application Publication No. 2001-298621.

Figure 2A:
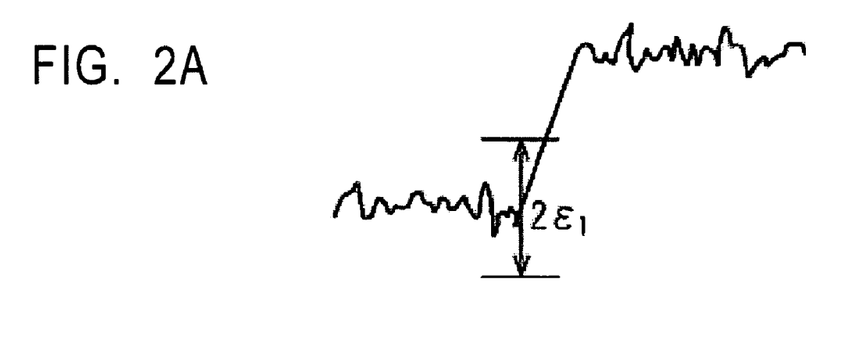
FIG. 2A shows an image signal input to an $\epsilon$-filter shown in FIG. 1.
Figure 2B:
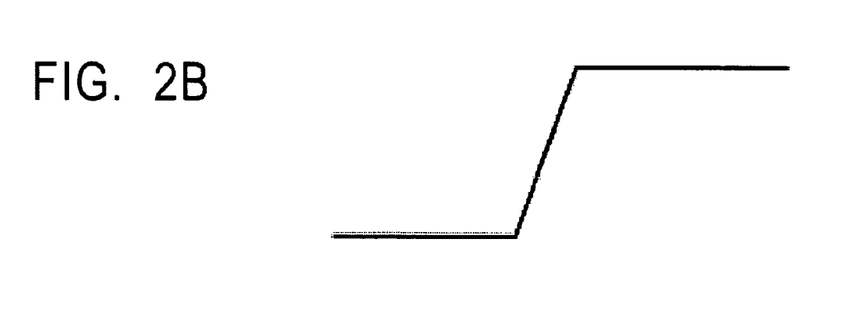
FIG. 2B shows an image signal output from the $\epsilon$-filter.

In the image signal processing apparatus shown in FIG. 1, an input image signal composed of pixels (pixel values) is input to an $\epsilon$-filter 1 and a subtracter 2. If, for example, an image signal that slightly fluctuates before and after a steep edge whose size is larger than a predetermined threshold $\epsilon1$, as shown in FIG. 2A, is input to the $\epsilon$-filter 1, the image signal is converted into an image signal in which only the edge is extracted, as shown in FIG. 2B. Then, the converted image signal is output to the subtracter 2 and an adder 4.

Figure 3:
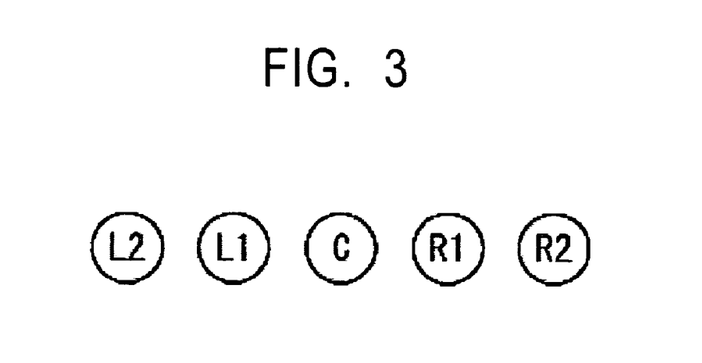
FIG. 3 shows an example of taps used in the $\epsilon$-filter.
Figure 4:
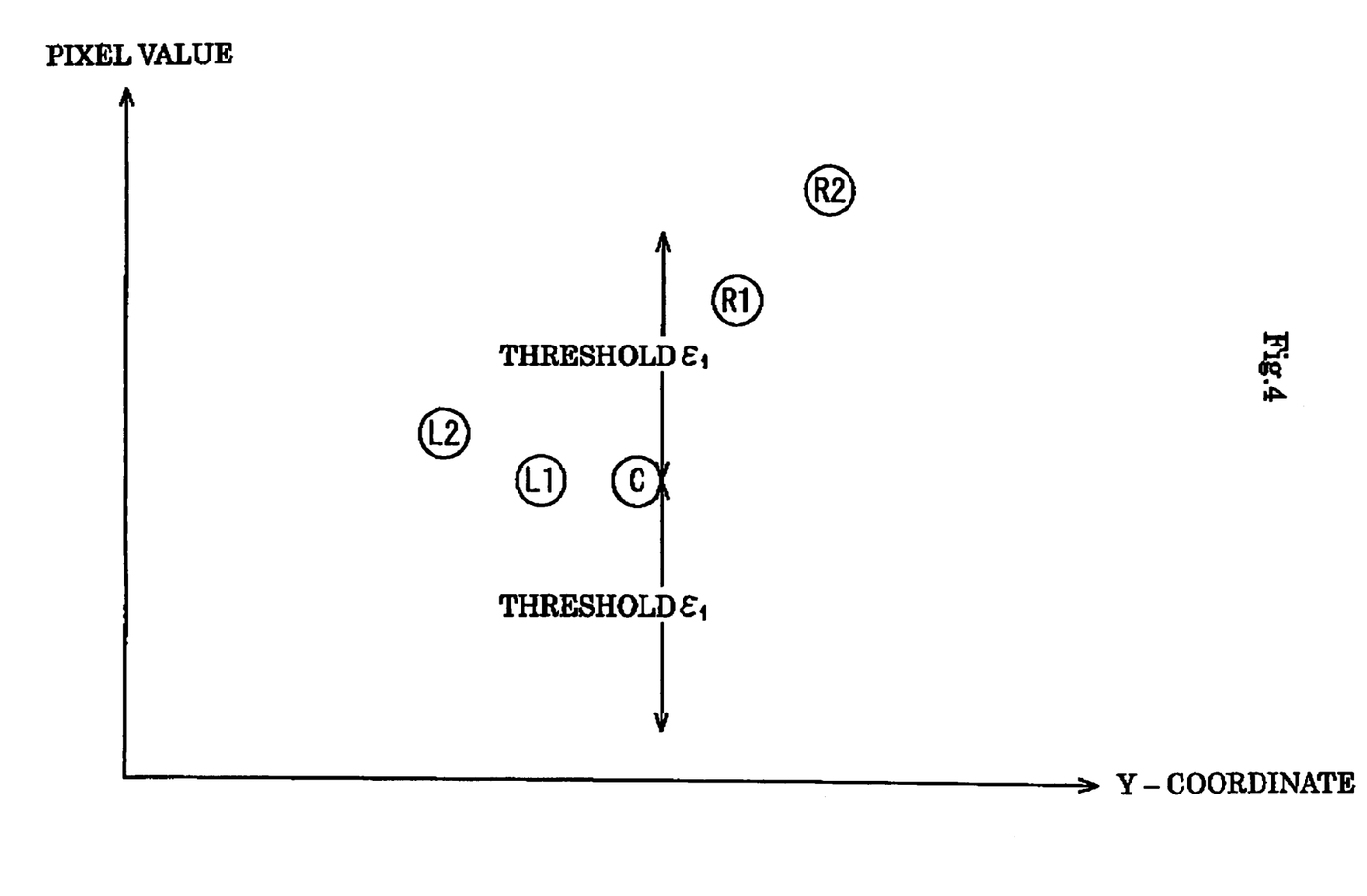
FIG. 4 is an illustration for explaining an operation of the $\epsilon$-filter.

Specific processing performed by the $\epsilon$-filter 1 will now be described with reference to FIGS. 3 and 4. The $\epsilon$-filter 1 sequentially designates each pixel of an input image as a target pixel C. As shown in FIG. 3, the $\epsilon$-filter 1 sets taps including a plurality of neighboring pixels (in this case, pixels L2, L1, R1, and R2) arranged consecutively in the horizontal direction around the target pixel C, and a weighted average of the pixel values of the target pixel C and the plurality of neighboring pixels is obtained using tap coefficients (for example {1, 2, 3, 2, 1}), as shown by Equation (1), to be output as a converted result C' corresponding to the target pixel C.

$$C'=(1 \cdot L2+2 \cdot L1+3 \cdot C+2 \cdot R1+1 \cdot R2)/9 \tag{1}$$

However, if a difference between the target pixel C and a neighboring pixel is larger than the predetermined threshold $\epsilon1$ (in FIG. 4, a difference between the target pixel C and the neighboring pixel R2 is larger than the threshold $\epsilon1$), calculation is performed using the pixel value of the target pixel C, instead of the pixel value of the neighboring pixel. In other words, in the case shown in FIG. 4, a calculation shown by Equation (2) is performed.

$$C'=(1 \cdot L2+2 \cdot L1+3 \cdot C+2 \cdot R1+1 \cdot C)/9 \tag{2}$$

Referring back to FIG. 1, the subtracter 2 subtracts the image signal input from the $\epsilon$filter 1 from the image signal input from the previous stage (this signal is equal to the signal that is input to the $\epsilon$-filter 1), so that an image signal that does not include an edge and that slightly fluctuates is extracted. Then, the subtracter 2 outputs the extracted image signal to an amplifier 3. The amplifier 3 amplifies the image signal output from the subtracter 2 and outputs the amplified image signal to the adder 4. The adder 4 adds the image signal, which is output from the amplifier 3, in which a non-edge portion that does not include the edge is amplified and the image signal, which is input from the $\epsilon$-filter 1, in which only the edge is extracted. The result of the addition is an image signal whose steep edge is maintained and whose non-edge portion is amplified.

Figure 5:
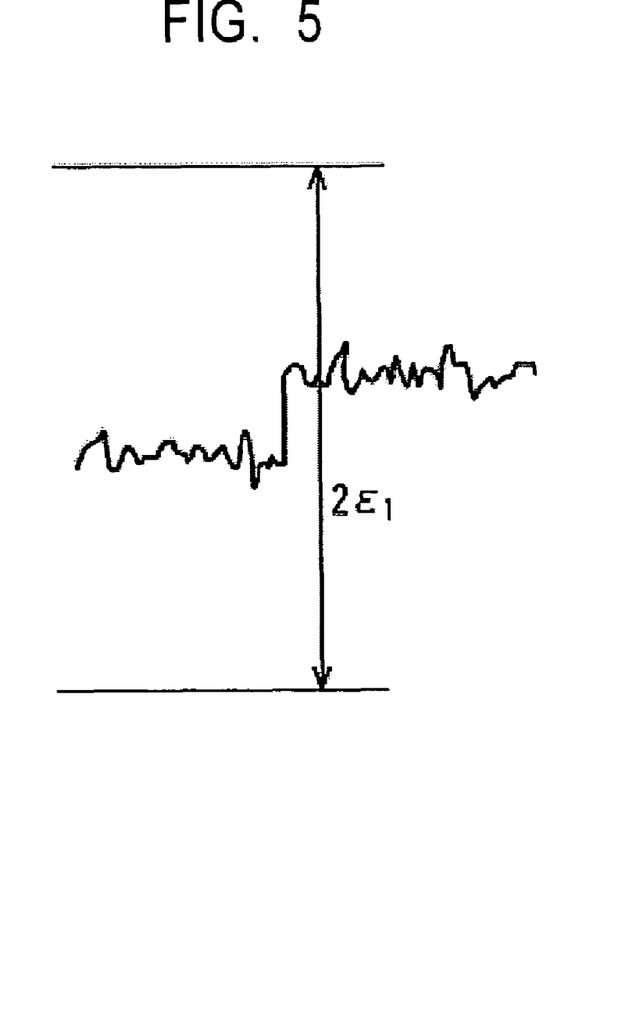
FIG. 5 is an illustration for explaining a problem of the $\epsilon$-filter.
Figure 6:
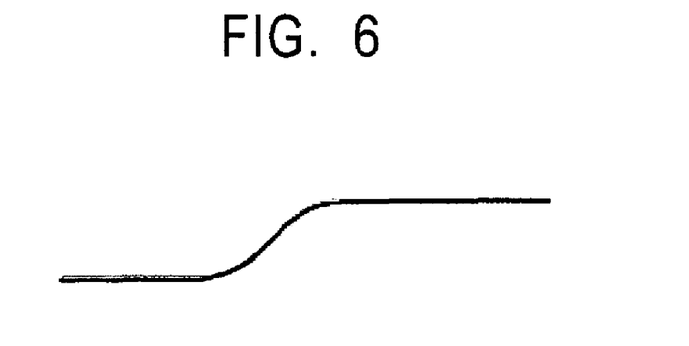
FIG. 6 is an illustration for explaining the problem of the $\epsilon$-filter.

According to the $\epsilon$-filter 1 of the image signal processing apparatus shown in FIG. 1, if the size of an edge in which a pixel level changes steeply is smaller than the predetermined threshold $\epsilon1$, as shown in FIG. 5, a converted image signal output from the $\epsilon$-filter 1 is smoothed, as shown in FIG. 6, and does not have a steep edge. Thus, the quality of simple pattern images or the like, in particular, including fine edges is significantly reduced.

SUMMARY OF THE INVENTION

In order to solve the above problems, it is an object of the present invention to maintain a fine edge and, at the same time, smooth a non-edge portion that does not include the edge.

A signal processing apparatus according to the present invention includes a first designating unit for sequentially designating each of signals arranged consecutively as a target signal; a second designating unit for designating a plurality of neighboring signals from among the signals arranged consecutively on the basis of the target signal designated by the first designating unit; a calculating unit for calculating differences between the target signal and the plurality of neighboring signals and for calculating a smoothing signal by obtaining a weighted average of the target signal and the plurality of neighboring signals in accordance with results of comparison between the differences and a first threshold; a determining unit for calculating the differences between the target signal and the plurality of neighboring signals and for determining whether or not a fine edge exists near the target signal in accordance with results of comparison between the differences and a second threshold, which is smaller than the first threshold; and a selecting unit for selecting one of the smoothing signal and the target signal in accordance with a result determined by the determining unit.

The signals may be pixel values of pixels constituting an image.

A signal processing method according to the present invention includes a first designating step of sequentially designating each of signals arranged consecutively as a target signal; a second designating step of designating a plurality of neighboring signals from among the signals arranged consecutively on the basis of the target signal designated by the first designating step; a calculating step of calculating differences between the target signal and the plurality of neighboring signals and of calculating a smoothing signal by obtaining a weighted average of the target signal and the plurality of neighboring signals in accordance with results of comparison between the differences and a first threshold; a determining step of calculating the differences between the target signal and the plurality of neighboring signals and of determining whether or not a fine edge exists near the target signal in accordance with results of comparison between the differences and a second threshold, which is smaller than the first threshold; and a selecting step of selecting one of the smoothing signal and the target signal in accordance with a result determined by the determining step.

A program on a recording medium according to the present invention includes a first designating step of sequentially designating each of signals arranged consecutively as a target signal; a second designating step of designating a plurality of neighboring signals from among the signals arranged consecutively on the basis of the target signal designated by the first designating step; a calculating step of calculating differences between the target signal and the plurality of neighboring signals and of calculating a smoothing signal by obtaining a weighted average of the target signal and the plurality of neighboring signals in accordance with results of comparison between the differences and a first threshold; a determining step of calculating the differences between the target signal and the plurality of neighboring signals and of determining whether or not a fine edge exists near the target signal in accordance with results of comparison between the differences and a second threshold, which is smaller than the first threshold; and a selecting step of selecting one of the smoothing signal and the target signal in accordance with a result determined by the determining step.

A program according to the present invention includes a first designating step of sequentially designating each of signals arranged consecutively as a target signal; a second designating step of designating a plurality of neighboring signals from among the signals arranged consecutively on the basis of the target signal designated by the first designating step; a calculating step of calculating differences between the target signal and the plurality of neighboring signals and of calculating a smoothing signal by obtaining a weighted average of the target signal and the plurality of neighboring signals in accordance with results of comparison between the differences and a first threshold; a determining step of calculating the differences between the target signal and the plurality of neighboring signals and of determining whether or not a fine edge exists near the target signal in accordance with results of comparison between the differences and a second threshold, which is smaller than the first threshold; and a selecting step of selecting one of the smoothing signal and the target signal in accordance with a result determined by the determining step.

According to the signal processing apparatus, the signal processing method, and the program of the present invention, differences between a target signal and a plurality of neighboring signals are calculated and a smoothing signal is calculated by obtaining a weighted average of the target signal and the plurality of neighboring signals in accordance with results of comparison between the differences and a first threshold. Also, it is determined whether or not a fine edge exists near the target signal in accordance with results of the differences and a second threshold, which is smaller than the first threshold, and one of the smoothing signal and the target signal is selected.

According to the present invention, a fine edge of pixel values can be maintained and, at the same time, a non-edge portion that does not include the edge can be smoothed.

DESCRIPTION OF THE PREFERRED EMBODIMENTS

Embodiments of the present invention will be described with reference to the drawings.

Figure 7:
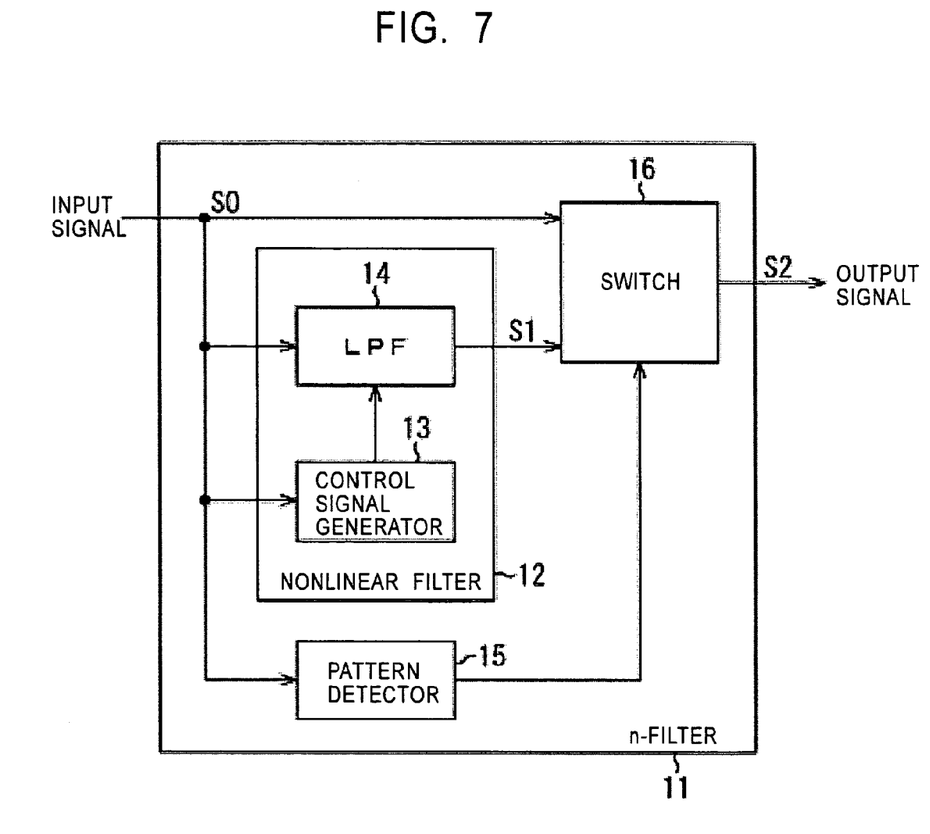
FIG. 7 is a block diagram showing an example of the structure of an n-filter according to an embodiment of the present invention.

FIG. 7 shows an example of the structure of a nonlinear filter having a function to detect a pattern of a pixel value (hereinafter, referred to as an n-filter 11) according to an embodiment of the present invention. The n-filter 11 is used, instead of an $\epsilon$-filter 1 of an image signal processing apparatus shown in FIG. 1, and includes a nonlinear filter 12, a pattern detector 15, and a switch 16. The nonlinear filter 12 maintains a steep edge whose size is larger than a threshold $\epsilon 1$ in fluctuations of pixels constituting an input image signal S0 and smoothes a non-edge portion that does not include the edge. The pattern detector 15 detects a fine edge in the fluctuations of the pixels constituting the input image signal S0 and notifies the switch 16 that the fine edge exists. The switch 16 outputs the input image signal S0 or an image signal S1, which is output from the nonlinear filter 12, to the subsequent stage as an output image signal S2 in accordance with the notification from the pattern detector 15.

The nonlinear filter 12 includes a control signal generator 13 and a low-pass filter (LPF) 14. The control signal generator 13 calculates the absolute values of differences between the pixel value of a target pixel C and the pixel values of neighboring pixels L2, L1, R1, and R2 and controls the LPF 14 in accordance with the results of the calculation. The LPF 14 performs non-linear filtering processing on the input image signal S0. The nonlinear filter 12 may be, for example, the $\epsilon$-filter 1 described above.

A filtering process performed by the n-filter 11 will now be described with reference to a flowchart shown in FIG. 8 by way of an example using taps of five pixels including a target pixel C shown in FIG. 3.

In step S1, the control signal generator 13 sequentially designates each of the pixels arranged in a raster order constituting the input image signal S0 as the target pixel C. In step S2, the control signal generator 13 designates the neighboring pixels L2, L1, R1, and R2 that are horizontally adjacent to the target pixel C. Furthermore, the control signal generator 13 notifies the pattern detector 15 about the designated target pixel C and the neighboring pixels L2, L1, R1, and R2.

In step S3, the control signal generator 13 calculates absolute values |C−L2|, |C−L1|, |C−R1|, |C−R2|, which are the absolute values of the differences between the pixel value of the target pixel C and the pixel values of the neighboring pixels L2, L1, R1, and R2, respectively, compares each of the calculated absolute values with the predetermined threshold $\epsilon 1$, and controls the LPF 14 in accordance with the results of the comparison. The LPF 14 performs nonlinear filtering processing on the input image signal S0 in accordance with control by the control signal generator 13. More specifically, for example, a weighted average of the pixel value of the target pixel C and the pixel values of the plurality of neighboring pixels is obtained using tap coefficients, as shown by Equation (1), to be output as a converted result C' corresponding to the target pixel C. However, if the absolute value of a difference between the pixel value of the target pixel C and the pixel value of a neighboring pixel is larger than the predetermined threshold $\epsilon 1$, the pixel value of the target value C, instead of the pixel value of the neighboring pixel, is used in the calculation for the weighted average.

In step S4, the pattern detector 15 calculates the absolute values of the differences between the pixel value of the target pixel C and the pixel values of the neighboring pixels L2, L1, R1, and R2 and compares each of the calculated absolute values with a threshold $\epsilon 2$, which is sufficiently smaller than the predetermined threshold $\epsilon 1$, so as to determine whether or not a fine edge exists near the target pixel C.

Figure 9:
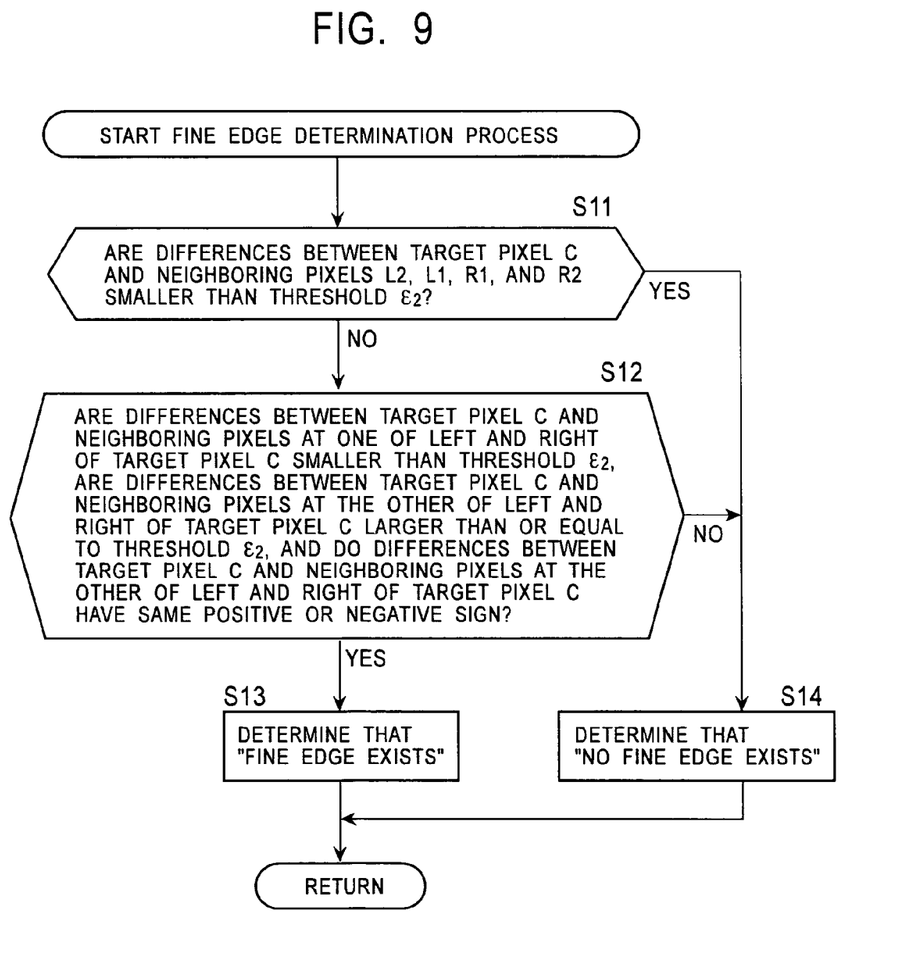
FIG. 9 is a flowchart of a process in step S4 shown in FIG. 8.

A fine edge determination process performed in step S4 will now be described with reference to FIG. 9. In step S11, the pattern detector 15 calculates the absolute values of the differences between the pixel value of the target pixel C and the pixel values of the neighboring pixels L2, L1, R1, and R2 and determines whether or not all the calculated absolute values are smaller than the threshold $\epsilon 2$. If all the absolute values are determined to be smaller than the threshold $\epsilon 2$ in step S11, it is determined that no fine edge exists near the target pixel C in step S14.

In contrast, if any of the calculated absolute values is determined to be larger than or equal to the threshold $\epsilon 2$ in step S11, the pattern detector 15 proceeds to step S12. In step S12, the pattern detector 15 determines whether or not all the absolute values of the differences between the target pixel C and the neighboring pixels (for example, the neighboring pixels L2 and L1) at one of the left and the right of the target pixel C are smaller than the threshold $\epsilon 2$, all the absolute values of the differences between the target pixel C and the neighboring pixels (in this case, the neighboring pixels R1 and R2) at the other of the left and the right of the target pixel C are larger than or equal to the threshold $\epsilon 2$, and the differences between the target pixel C and the neighboring pixels (in this case, the neighboring pixels R1 and R2) at the other of the left and the right of the target pixel C have the same positive or negative sign. If the pattern detector 15 determines that all the conditions described above are satisfied and the determination in step S12 is affirmative, the pattern detector 15 proceeds to step S13. In step S13, the pattern detector 15 determines that a fine edge exists near the target pixel C.

If the pattern detector 15 determines that all the conditions described above are not satisfied and the determination in step S12 is negative, the pattern detector 15 proceeds to step S14. In step 14, the pattern detector 15 determines that no fine edge exists near the target pixel C.

Figure 10:
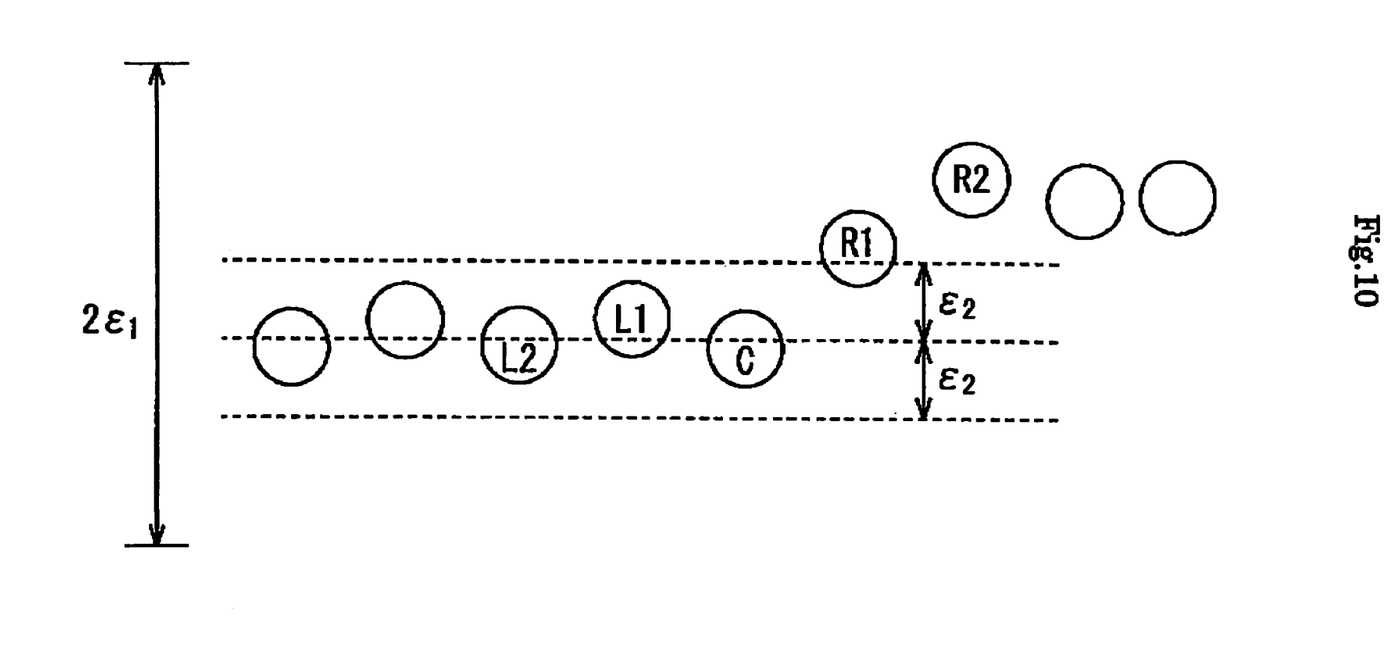
FIG. 10 shows an example in which it is determined that a fine edge exists.

For example, when the target pixel C and the neighboring pixels L2, L1, R1, and R2 have relationships shown in FIG. 10, absolute values |L2−C| and |L1−C|, which are the absolute values of differences between the target pixel C and the neighboring pixels L2 and L1 at the left of the target pixel C, respectively, are smaller than the threshold $\epsilon 2$, absolute values |R1−C| and |R2−C|, which are the absolute values of differences between the target pixel C and the neighboring pixels R1 and R2 at the right of the target pixel C, respectively, are larger than or equal to the threshold $\epsilon 2$, and differences (R1−C) and (R2−C) between the target pixel C and the neighboring pixels R1 and R2 at the right of the target pixel C, respectively, have the same sign (in this case, they are positive). Thus, it is determined that a fine edge exists near the target pixel C.

Figure 11:
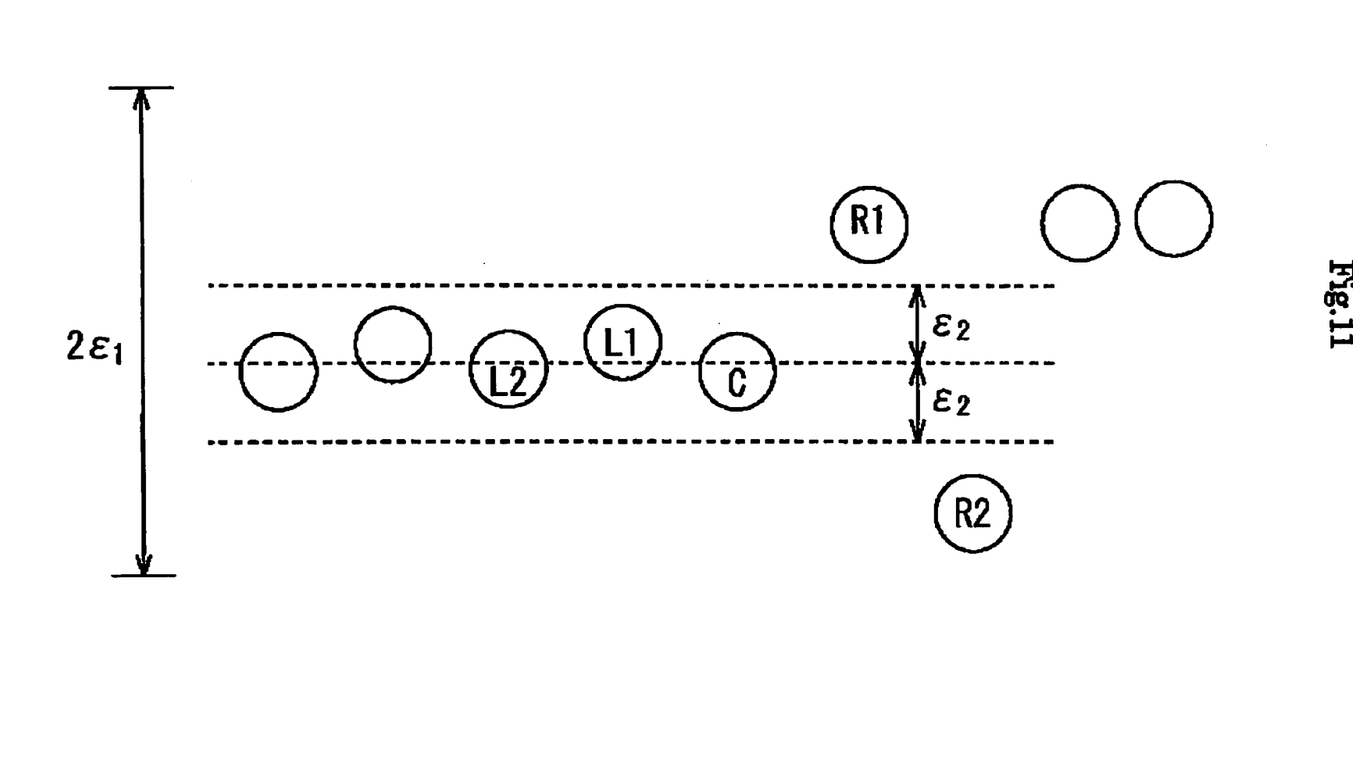
FIG. 11 shows an example in which it is determined that no fine edge exists.

Also, for example, when the target pixel C and the neighboring pixels L2, L1, R1, and R2 have relationships shown in FIG. 11, although the absolute values |L2−C| and |L1−C| are smaller than the threshold $\epsilon 2$ and the absolute values |R1−C| and |R2−C| are larger than or equal to the threshold $\epsilon 2$, the differences (R1−C) and (R2−C) do not have the same sign (in this case, (R1−C) is positive and (R2−C) is negative). Thus, it is determined that no fine edge exists near the target pixel C.

Figure 12:
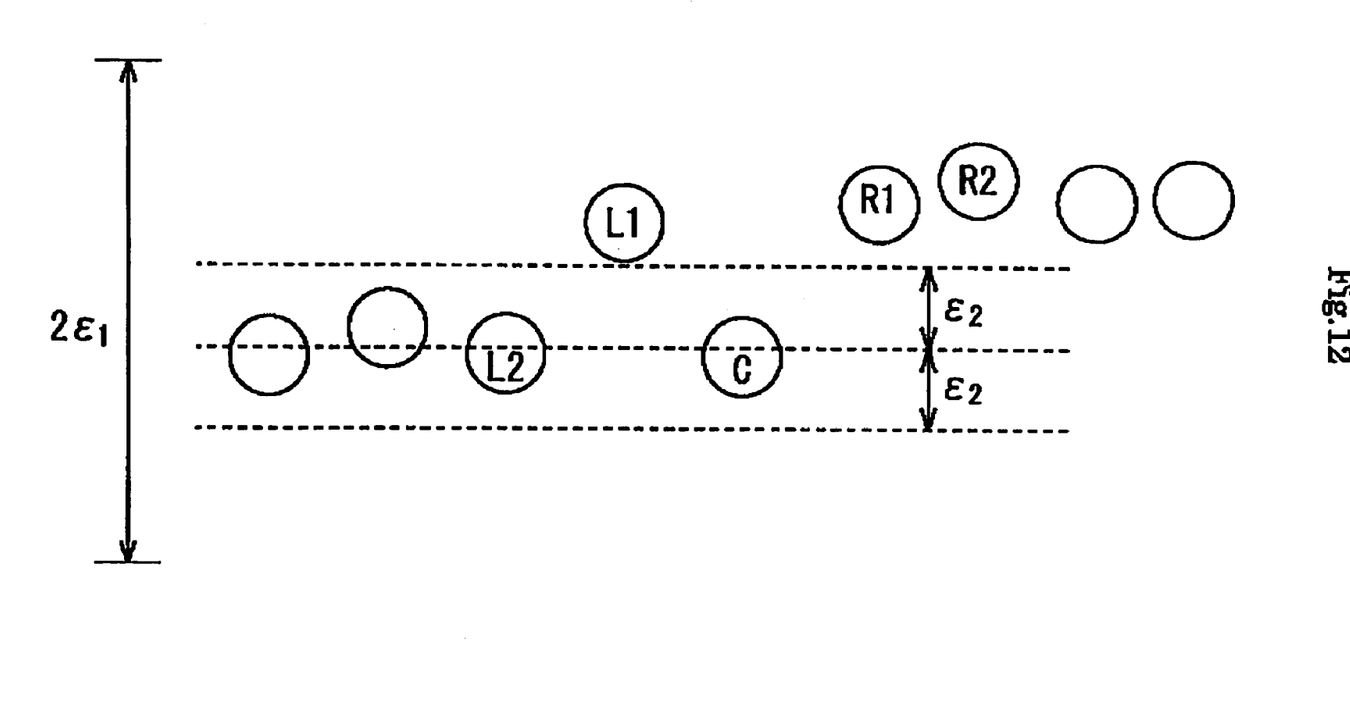
FIG. 12 shows an example in which it is determined that no fine edge exists.

Furthermore, for example, when the target pixel C and the neighboring pixels L2, L1, R1, and R2 have relationships shown in FIG. 12, only one of the absolute values of the differences between the target pixel C and the neighboring pixels at the left of the target pixel C is smaller than the threshold $\epsilon 2$ and none of the absolute values of the differences between the target pixel C and the neighboring pixels at the right of the target pixel C are smaller than the threshold $\epsilon 2$. Thus, it is determined that no fine edge exists near the target pixel C.

Figure 8:
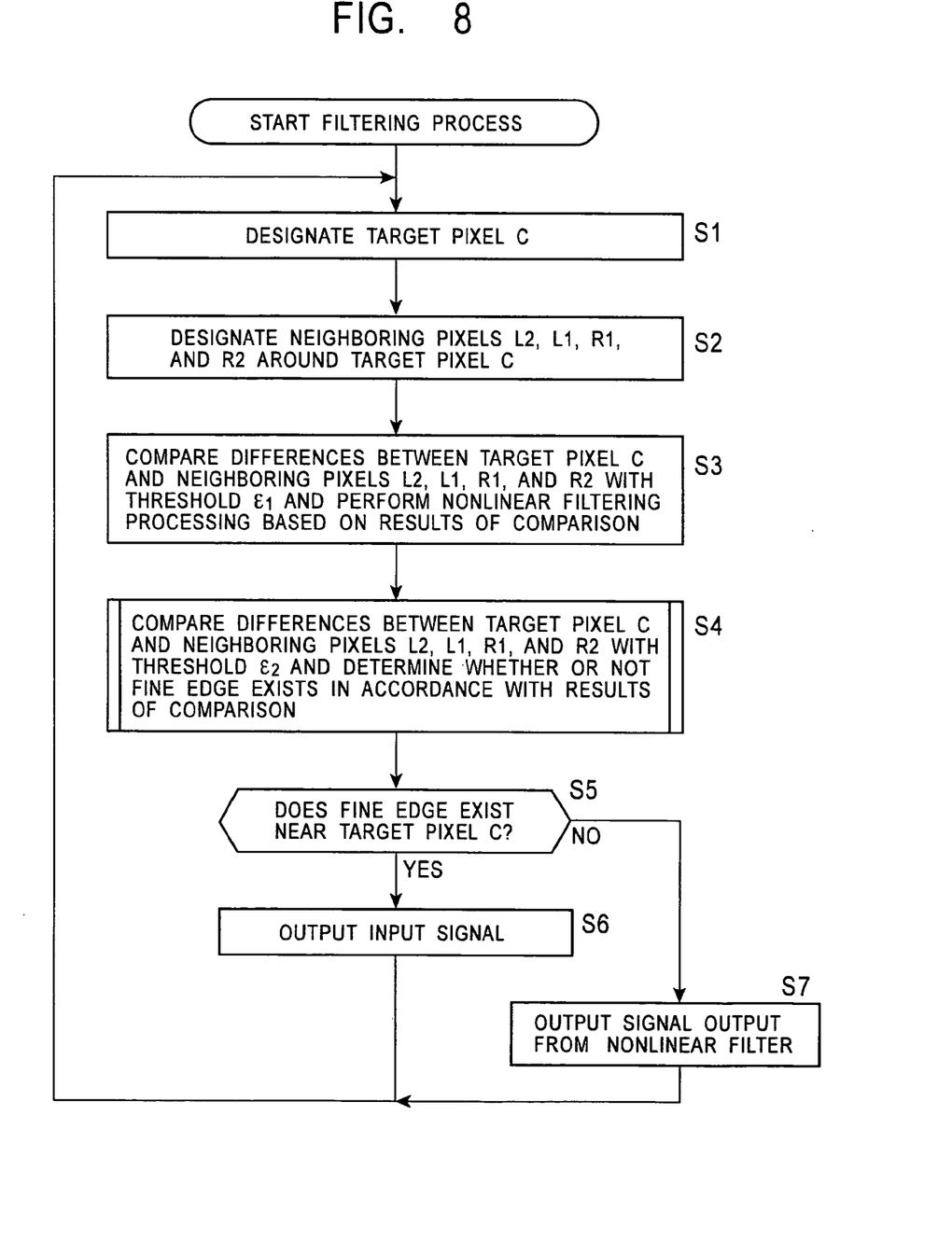
FIG. 8 is a flowchart of a filtering process performed by the n-filter.

After determining whether or not a fine edge exists near the target pixel C in step S4, as described above, the pattern detector 15 proceeds to step S5 in FIG. 8. If it is determined that a fine edge exists near the target pixel C. in step S5 in accordance with the determination in step S4, the pattern detector 15 proceeds to step S6 to notify the switch 16 that the fine edge exists near the target pixel C. In accordance with the notification, the switch 16 outputs the input image signal S0 to the subsequent stage.

In contrast, if it is determined that no fine edge exists near the target pixel C in step S5 in accordance with the determination in step S4, the pattern detector 15 proceeds to step S7 to notify the switch 16 that no fine edge exists near the target pixel C. In accordance with the notification, the switch 16 outputs the image signal S1, which is output from the nonlinear filter 12, to the subsequent stage.

Then, the process returns to step S1. The pixel serving as the neighboring pixel R1 becomes designated as a new target pixel C, and a process similar to the process described above is repeated. Accordingly, the filtering process is performed by the n-filter 11 as described above.

As described above, the n-filter 11 detects a fine edge on the basis of the threshold $\epsilon 2$ and an output from the nonlinear filter 12 is not used for a portion in which a fine edge exists. Thus, a significant reduction in the quality of a simple pattern image or the like, in particular, including a fine edge can be avoided.

The present invention is applicable to various apparatuses using image signals, such as video cameras, digital still cameras, printers, displays, and computers.

For example, when the present invention is applied to a computer performing image processing, for adjusting the image contrast, a contrast-adjusted image with high quality can be achieved while a dynamic range is maintained. Also, for combining images obtained under different illumination conditions, only differences of contrast components of the images can be compensated for and a natural combined image can be generated.

Although the series of processing described above can be performed by hardware, they may be performed by software. If the series of processing are performed by software, a program constituting the software is installed from a recording medium on a computer installed in dedicated hardware or, for example, a general-purpose personal computer 50 shown in FIG. 13 that is capable of performing various functions by installing various programs.

Figure 13:
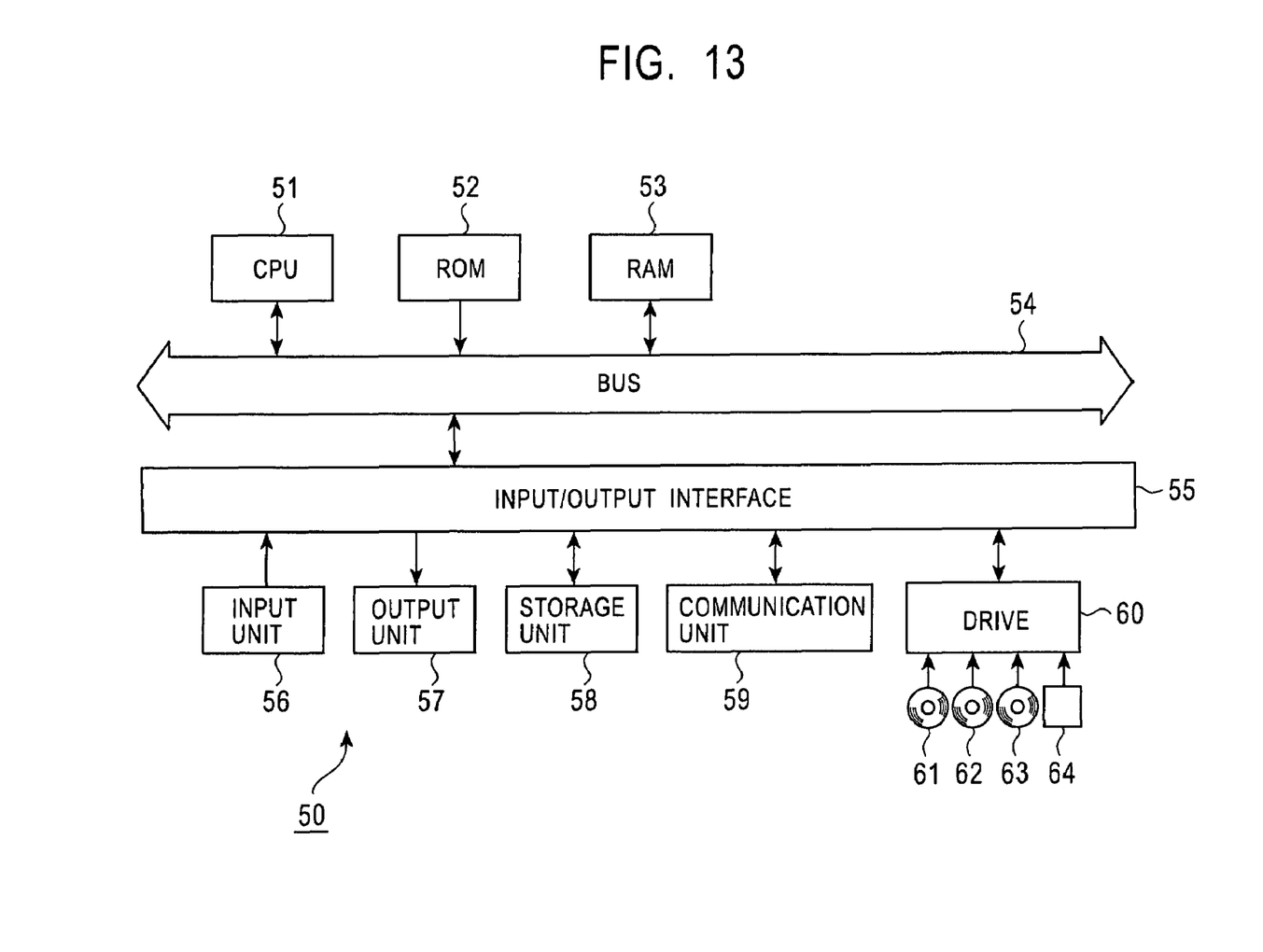
FIG. 13 is a block diagram showing an example of the structure of a personal computer according to another embodiment of the present invention.

The personal computer 50 contains a central processing unit (CPU) 51. The CPU 51 is connected to an input/output interface 55 via a bus 54. A read-only memory (ROM) 52 and a random-access memory (RAM) 53 are connected to the bus 54.

The input/output interface 55 is connected to an input unit 56 including input devices, such as a keyboard, a mouse, and a remote controller for inputting operation commands by a user; an output unit 57 for outputting a combined image signal to a display; a storage unit 58 including a hard disk drive and other devices for storing a program and various data therein; and a communication unit 59 including a modem, a local area network (LAN) adapter, and the like and performing communication processing via a network, typified by the Internet. Also, the input/output interface 55 is connected to a drive 60 for reading and writing data on recording media, such as a magnetic disk 61 including a flexible disk, an optical disc 62 including a compact disc-read only memory (CD-ROM) and a digital versatile disc (DVD), a magneto-optical disk 63 including a mini disc (MD), a semiconductor memory 64, and the like.

A program that is stored on the magnetic disk 61 or the semiconductor memory 64 for causing the CPU 51 to perform the filtering process described above is supplied to the personal computer 50, and is read by the drive 60 to be installed on the hard disk drive contained in the storage unit 58. Alternatively, the program may be supplied via the network. The program installed on the storage unit 58 is loaded into the RAM 53 and is performed in accordance with an instruction from the CPU 51 corresponding to a command input to the input unit 56 by a user.

The steps described in the flowcharts are not necessarily performed in accordance with the time sequence following the order described above. The steps may be performed in parallel or individually.

What is claimed is:

1. A signal processing apparatus for adjusting levels of signals arranged consecutively, the apparatus comprising:

first designating means for sequentially designating each of said signals as a target signal;

second designating means for designating a plurality of neighboring signals from among said signals on the basis of the target signal designated by the first designating means;

calculating means for calculating differences between the target signal and the plurality of neighboring signals and for calculating a smoothing signal by obtaining a weighted average of the target signal and the plurality of neighboring signals in accordance with results of comparison between the differences and a first threshold;

determining means for calculating the differences between the target signal and the plurality of neighboring signals and for determining whether or not a fine edge exists near the target signal in accordance with results of comparison between the differences and a second threshold, which is smaller than the first threshold; and selecting means for selecting one of the smoothing signal and the target signal in accordance with a result determined by the determining means.

2. The signal processing apparatus according to claim 1, wherein said signals are pixel values of pixels constituting an image.

3. A signal processing method for adjusting levels of signals arranged consecutively, the method comprising:

a first designating step of sequentially designating each of said signals as a target signal;

a second designating step of designating a plurality of neighboring signals from among said signals on the basis of the target signal designated by the first designating step;

a calculating step of calculating differences between the target signal and the plurality of neighboring signals and of calculating a smoothing signal by obtaining a weighted average of the target signal and the plurality of neighboring signals in accordance with results of comparison between the differences and a first threshold;

a determining step of calculating the differences between the target signal and the plurality of neighboring signals and of determining whether or not a fine edge exists near the target signal in accordance with results of comparison between the differences and a second threshold, which is smaller than the first threshold; and a selecting step of selecting one of the smoothing signal and the target signal in accordance with a result determined by the determining step.

4. A recording medium recording therein a computer-readable program for adjusting levels of signals arranged consecutively, the program comprising:

a first designating step of sequentially designating each of said signals as a target signal;

a second designating step of designating a plurality of neighboring signals from among said signals on the basis of the target signal designated by the first designating step;

a calculating step of calculating differences between the target signal and the plurality of neighboring signals and of calculating a smoothing signal by obtaining a weighted average of the target signal and the plurality of neighboring signals in accordance with results of comparison between the differences and a first threshold;

a determining step of calculating the differences between the target signal and the plurality of neighboring signals and of determining whether or not a fine edge exists near the target signal in accordance with results of comparison between the differences and a second threshold, which is smaller than the first threshold; and a selecting step of selecting one of the smoothing signal and the target signal in accordance with a result determined by the determining step.

5. A program for adjusting levels of signals arranged consecutively, the program causing a computer to perform a process comprising:

a first designating step of sequentially designating each of said signals as a target signal;

a second designating step of designating a plurality of neighboring signals from among said signals on the basis of the target signal designated by the first designating step;

a calculating step of calculating differences between the target signal and the plurality of neighboring signals and of calculating a smoothing signal by obtaining a weighted average of the target signal and the plurality of neighboring signals in accordance with results of comparison between the differences and a first threshold;

a determining step of calculating the differences between the target signal and the plurality of neighboring signals and of determining whether or not a fine edge exists near the target signal in accordance with results of comparison between the differences and a second threshold, which is smaller than the first threshold; and a selecting step of selecting one of the smoothing signal and the target signal in accordance with a result determined by the determining step.

* * * * *